United States Patent Office 3,426,676
Patented Feb. 11, 1969

3,426,676
DECIMAL POINT OR COMMA PRINTING MEANS IN MULTI-CIPHER DIGITAL PRINTERS
Alfred Zielke, Peine, Germany, assignor to Elmeg Elektro Mechanik G.m.b.H., Peine, Germany
Filed Mar. 23, 1967, Ser. No. 625,524
Claims priority, application Germany, Mar. 26, 1966, E 31,326
U.S. Cl. 101—93
Int. Cl. B41j 5/30; G06c 19/04
11 Claims

ABSTRACT OF THE DISCLOSURE

A high-speed multi-cipher digital printer which is to be electrically connected to and controlled by an electronic computer or similar apparatus for printing the numerical values which are transmitted thereto from the computer by means of current impulses, and which is designed for manually inserting a decimal point or comma in any desired decade position of the printer; for preventing the accidental insertion of additional points or commas; for transmitting a signal to the computer to indicate therein the particular position of this point or comma so that the computer will thereafter transmit the values to the printer with the decimal point or comma in the correct position in relation to its position as set in the printer; and for preventing the printing of any undesired zeros at the left of this point or comma, for instance, of all zeros in front of a zero at the first position at the left of this point or comma or of all zeros at the left of any first numeral other than a zero.

The present invention relates to a multi-cipher digital printer which is to be electrically connected to and controlled by an electronic computer or similar apparatus and is adapted to print the numerical values which are determined by the calculations of the computer.

There are various types of multi-cipher digital printers already known which are used in connection with electric or electronic computers or similar apparatus and wherein the printer is provided with multipart type carriers which may be in the form of type rollers, type wheels, type rods or the like. By means of current impulses which are transmitted from the computer, these type carriers may be set independently of each other to a certain value in each decade and be thereafter struck against a printing base which usually consists of a printing roller.

It is also already known to provide such a digital printer with a mechanism which prevents the printing of zeros in front of a first numeral other than a zero.

It is the principal object of the present invention to provide a high-speed multi-cipher digital printer of the above-mentioned type to which numerical values are transmitted by the computer by means of current impulses and these values are set up in the printer for being printed, and which is designed for manually inserting a decimal point or comma in any desired decade position of the printer, and for preventing the accidental insertion of additional points or commas. The printer according to the invention is further designed so as to transmit a signal to the computer to indicate therein the particular position of this decimal point or comma so that the computer will thereafter carry out the calculations in the proper relation to the position of the decimal point or comma as set in the printer. It is a further object of the invention to provide this printer with a so-called zero suppressing device which is adapted to prevent the printing of all undesirable zeros at the left of the decimal point or comma, for instance, of all zeros in front of a first zero at the left of this point or comma or of all zeros at the left of any first numeral other than a zero.

For attaining these objects, it is one of the principal features of the digital printer according to the invention that each type carrier of this printer, which is adjustable by an associated control wheel in accordance with the position to which this wheel is set by the electric impulse which is received from the computer, is operatively associated with a separate member carrying a comma or point symbol which is movable in the same direction as the type carrier and adapted to be moved to the desired printing position by means of a manually adjustable setting member. According to the invention, this setting member is also adapted to lock the zero suppressing device in a position in which during the printing operation those type carriers which are located in front of a first numeral other than a zero or of a zero at the first position at the left of the decimal point or comma and are set so that their zeros face the printing roller will be arrested in a neutral position. When this setting member is actuated, it will also actuate another locking device which will lock all other point or comma-carrying members and prevent them from being moved to the printing position, and it will further move a switch to a position in which it closes a circuit through which the selected decimal point or comma position will be reported to the computer.

Another feature of the invention consists in providing the point or common-carrying member in the form of a three-armed lever which is pivotally mounted on one arm of a type lever which, in turn, is pivotable about another axis. One arm of this three-armed lever is movable within a guide slot which is provided in one sector-shaped arm of a two-armed lever which forms the above-mentioned setting member and is pivotable about the axis of the control wheel. The second arm of the three-armed lever carries the point or comma symbol on its free end facing the printing roller, while the third arm forms a spring which is provided on one side of its free end with a spherical projection which is adapted to engage into one or the other of two bores in the type lever for locking the point or comma-carrying arm in a fixed position either for its printing operation or while no printing operation is carried out.

It is another feature of the invention to provide each control wheel with a recess at a point of its periphery which corresponds to the position in which the control wheel and the associated type carrier are to be located for each printing of a zero. Into this recess a noselike projection on a feeler lever is adapted to engage which is pivotable at one end about an axis and is pressed by spring action toward the peripheral surface of the control wheel. When this nose on the feeler lever engages into the recess in the control wheel, the other end of this lever which is connected by a link to a pawl is pivoted upwardly and thereby pivots this pawl out of engagement with another pawl which is pivotably mounted on the type lever. The type lever which carries the type carrier is thereby separated from the drive of the printing mechanism and is thus put out of action.

Another feature of the invention consists in providing the end of the other arm of the lever which forms the setting member with a stop or locking surface which, when the setting member is pivoted to the desired point or comma position, presses against a tab or detent on the feeler lever, thereby prevents the nose on the feeler lever from engaging into the recess in the peripheral surface of the control wheel, and thus locks the zero-suppressing device.

Another feature of the invention consists in providing each feeler lever with a lateral projection which overlaps the adjacent feeler which is associated with the control wheel for the next lower decade. This projection on any feeler lever, the nose of which cannot engage into the recess in the peripheral surface of the associated control wheel because this wheel has been turned so that this recess is no longer opposite to the nose, then prevents the noses of all lower feeler levers (i.e., those for the lower decade wheels) from engaging into their associated wheel recesses since this first projection as well as the projection on each following lower feeler lever will then overlap the next lower feeler.

A further feature of the invention consists in providing a main drive shaft which is driven so as to carry out a single revolution when a printing operation is to be effected, and in providing on this drive shaft a pair of cam disks which are turned by the drive shaft and control the movements of a pair of levers which are adapted to lock the mentioned pawls to each other and then to pivot the type lever carrying a type roller to a position in which this type roller is disengaged from the control wheel and moved into engagement with the printing roller.

It is another important feature of the invention that the printing pressure of each type roller against the printroller is determined by the action of a tension spring one end of which is connected to the type lever, while its other end is connected to one end of one of the mentioned pawls which is pivotably mounted at its other end on the free end of the type lever. This tension spring has the further advantage that it will compensate for any inaccuracies of manufacture as well as bearing play of the parts with which this spring is associated. The invention further provides another tension spring which is connected to the type lever and adapted when the printing operation is completed to pivot the type lever back to its original position in which its type roller is in engagement with the control wheel.

It is another object of the invention to provide suitable means for arresting the type roller in its adjusted position during the time when it disengages from the associated control wheel and is moved toward and against the printing roller and until it is returned to its original position in engagement with the control wheel. For attaining this object, the invention provides another pawl which is pivotably mounted on the type lever and held by a tension spring in an inoperative position out of engagement with the type roller and in engagement with a stop member as long as the type roller is in geared engagement with the control wheel, and which then engages with and locks the gear teeth of the type roller when the latter disengage from the gear teeth of the control wheel during the movement of the type roller toward the printing roller and until the type roller at the completion of the printing operation is pivoted back to its original position in engagement with the control wheel.

Another object of the invention consists in providing novel and suitable means for very quickly and accurately adjusting the control wheels and through the latter the type rollers of the printer to a position in which the types on the type rollers facing the printing roller and to be printed thereon correspond to the numerical value which is determined by the computer. According to the invention, these means comprise a stopping pawl for each control wheel which when released will engage under the action of a spring with a rapid motion between the teeth of the control wheel during the forward rotation of the latter, a releasing pawl which until released holds the stopping pawl in its retracted position under tension, and an electromagnet which may be energized by a current impulse transmitted from the computer in accordance with the number to be printed and then pivots the releasing pawl so as to disengage from the stopping pawl which thereupon engages with the teeth of the control wheel and arrests this wheel and thus also the type roller with which it is in geared connection in the proper position.

Since the entire digital printer according to the invention should be of a very small and compact size, especially if it is to be mounted within the housing of the computer, and since the entire assembly of its adjacent control wheels, type rollers, pawls and levers may be designed so as to take up a very short length and a much shorter length than that which would be required by the electromagnets if they were mounted in one row, the invention further provides that these electromagnets be mounted in three different rows which are disposed about the common pivot axis of all of the releasing pawls so that each of these rows extends at an angle of 90° to the adjacent row. The armature of each magnet engages into a recess in the associated releasing pawl near its pivot axis and when being attracted by the magnet so as to disengage the releasing pawl from the stopping pawl, it has to overcome the force of a tension spring which after the actuation of the stopping pawl returns the releasing pawl into engagement with the stopping pawl.

The present invention further provides suitable means for insuring that type rollers of the digital printer are accurately adjusted so as to print the identical number which is determined by the electronic computer or similar apparatus to which the printer is connected. For this purpose, the control wheels of all decades are associated with a common rotary switch which is moved in synchronism with the drive member of the control wheel and is adapted during the rotation of these wheels and the associated type rollers to transmit an electric impulse to the computer to indicate therein the changing position of these wheels and rollers and the different types or numerals thereon. If one of these type rollers is turned to the position in which its type facing the printing roller coincides with the particular number to be printed which may be stored in an accumulator of the computer, the computer thereupon sends an impulse to the electromagnet for the particular decade which by means of the two associated releasing and stopping pawls then immediately stops this control wheel and type roller so that the proper type on the type roller will be printed. When all type rollers are set in this manner and the entire number has been printed by the type rollers, a pair of equal cam disks which are mounted on the main drive shaft of the printer will pivot a bridge-shaped lever about its axis which thereby returns all stopping pawls to their original position and into engagement with the releasing pawls and also tightens the springs of the stopping pawls so that the printer will then again be in its inactive position and ready for its next actuation.

Among the numerous advantages of the invention as previously described is to be mentioned particularly that, if a number to be printed should designate a fraction, the new printer only permits a single point or comma, namely the decimal point or comma, to be inserted in this number but in any decade position thereof. An accidental insertion of more than one point or comma in any numerical value to be printed is therefore impossible. The invention further permits all zeros at the left of a decimal point or comma or, if desired, all zeros at the left of one zero directly in front of such a decimal point or comma to be suppressed. If, however, a value such as 1030.045 or 0.00123 is to be printed, the printer according to the invention will print the zero or zeros at the left or right of the decimal point or comma between this point or comma and a numeral other than a zero. Furthermore, if the decimal point or comma should be set in the tenth position, a value of 0.0000123 will be automatically indicated as 0.0000123000.

According to another embodiment of the invention, the digital printer as previously described may be modified by providing each point or comma-setting element not with an individual handle or the like but with a nose which by means of a spring-loaded rod may be inserted into a recess in one of a plurality of similar cam disks the recesses of which are peripherally offset relative to each other and which are mounted on a square shaft and together thus form a stepped roller. For turning this shaft, one end thereof carries a handwheel which is provided with numerals in accordance with the number of positions in which the decimal point or comma may be inserted. This handwheel is provided with a contact spring which is adapted to close contacts which are to be electrically connected to the electronic computer so as to indicate therein the particular position to which the decimal point or comma has been adjusted. When the handwheel is being turned it is only possible to insert the nose of one setting element into the recess of the associated cam disk. Therefore only one point or comma can be inserted between the decades of any numeral to be printed.

Aside from numerous other inventive features, this embodiment has the advantage of being inexpensively produced especially because all of the cam disks which are mounted on the square shaft may be made of an identical shape. By designing each of these cam disks in such a manner that one side of its square hole extends at an angle of 22.5° to one side of the angle defining its recess, it is possible to mount eight identical cam disks in differently staggered positions of their recesses on the same square shaft, The above-mentioned as well as numerous other features of the present invention will become further apparent from the following detailed description thereof which is to be read with reference to the accompanying drawings, in which—

FIGURE 12 shows a view similar to FIGURE 11 in which the digital printer is in a position in which a number without a point or comma is to be printed; while

Figure 1:
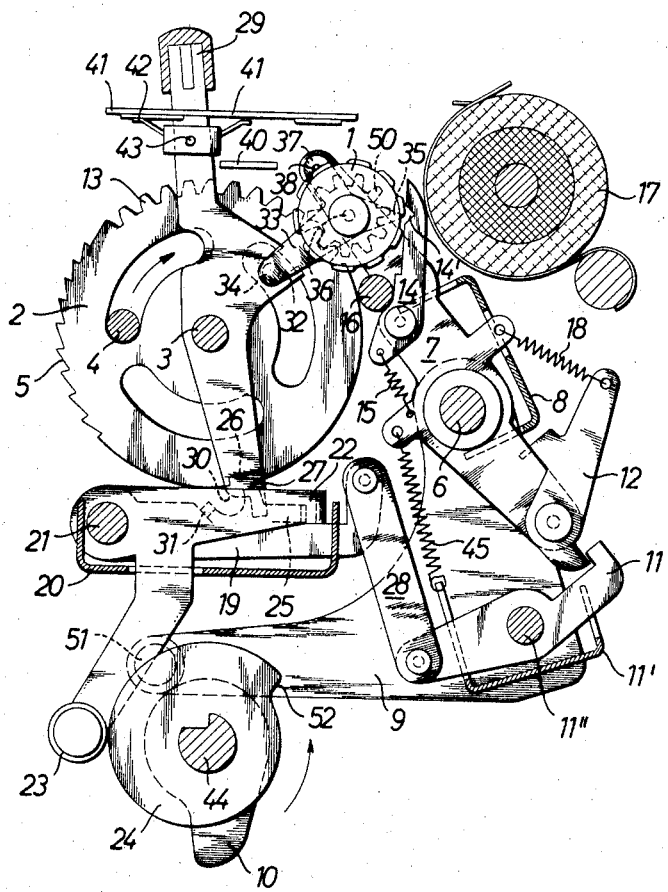
FIGURE 1 shows a diagrammatic side view of the digital printer in its inactive position.
Figure 1A:
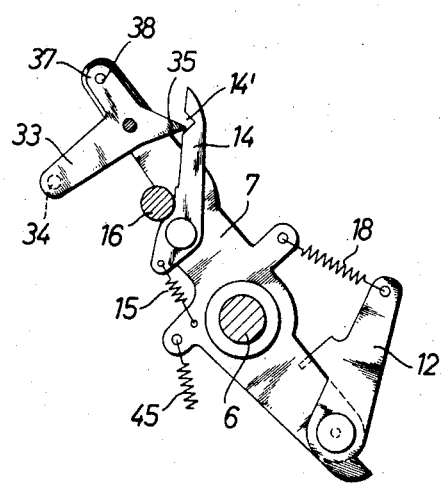
FIGURE 1a shows a detail view of a type lever with its pawls and the symbol carrier in the position as shown in FIGURE 1.
Figure 2:
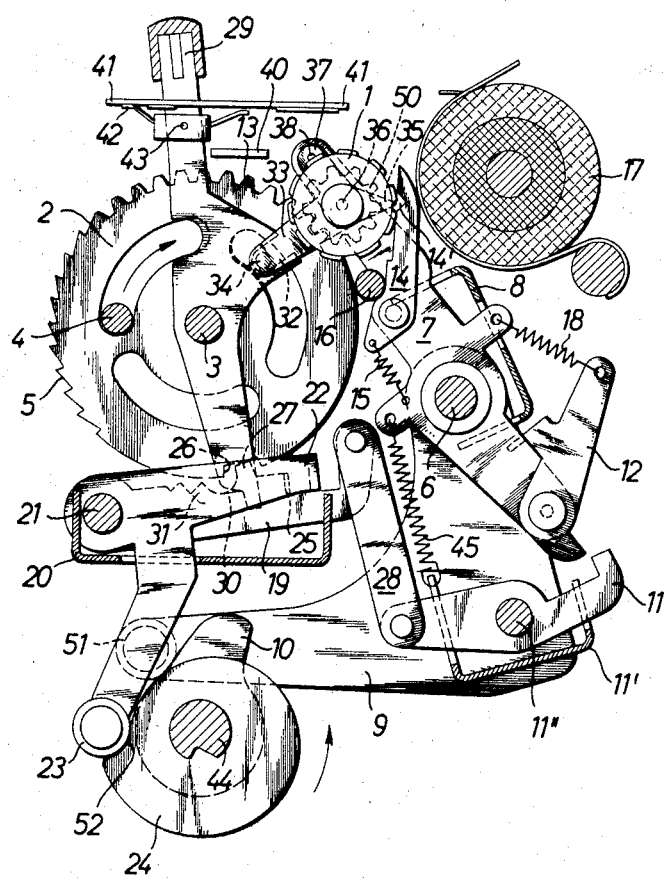
FIGURE 2 shows a similar view of the printer in the position in which no zeros can be printed since the feeler lever engages into the recess in the control wheel and the two pawls which are associated with the type lever therefore cannot engage with each other.
Figure 3:
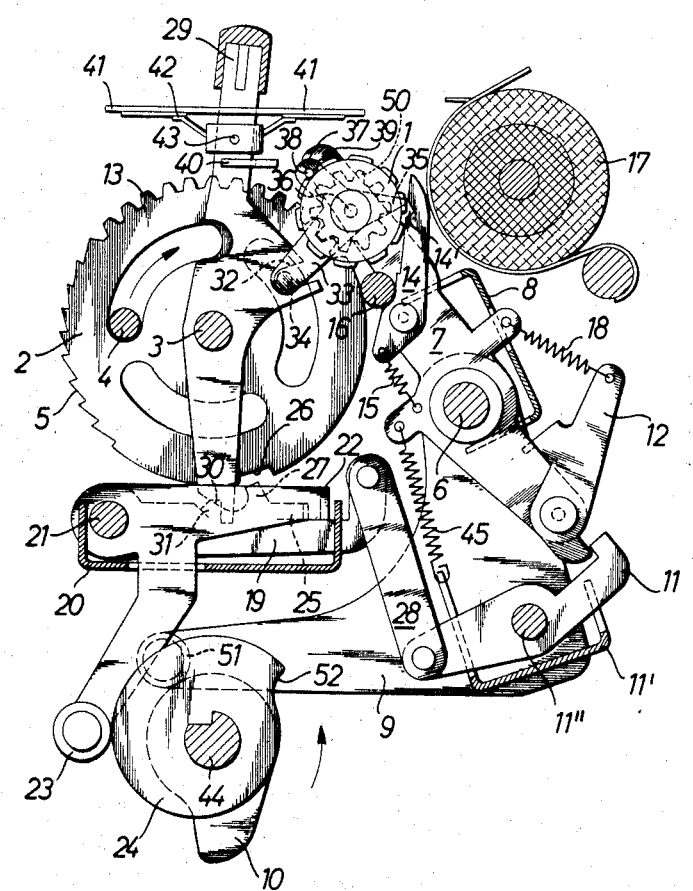
FIGURE 3 shows a similar view of the printer in the position in which the zero-suppressing device is rendered inoperative.
Figure 4:
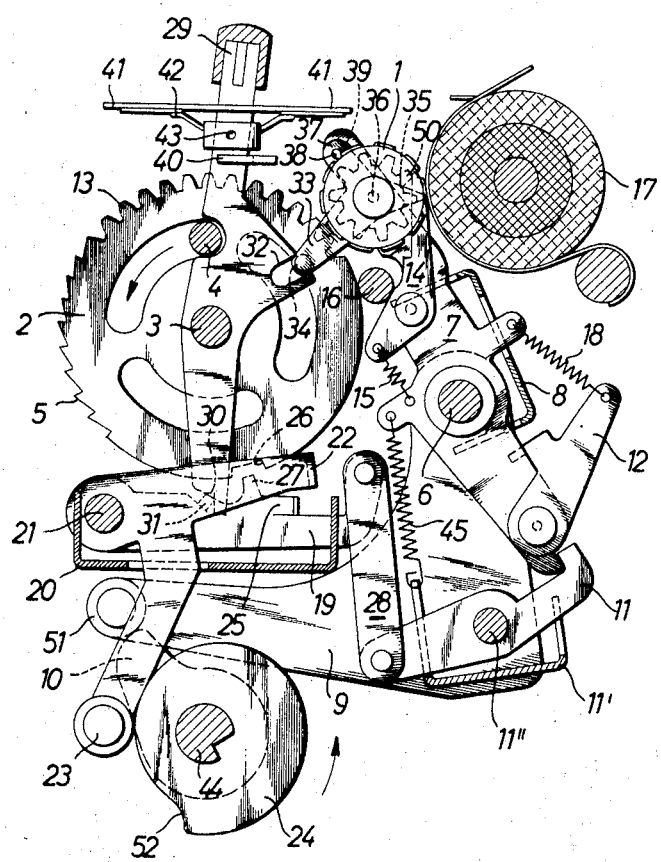
FIGURE 4 shows a similar view of the printer in the position in which a zero may be printed.
Figure 5:
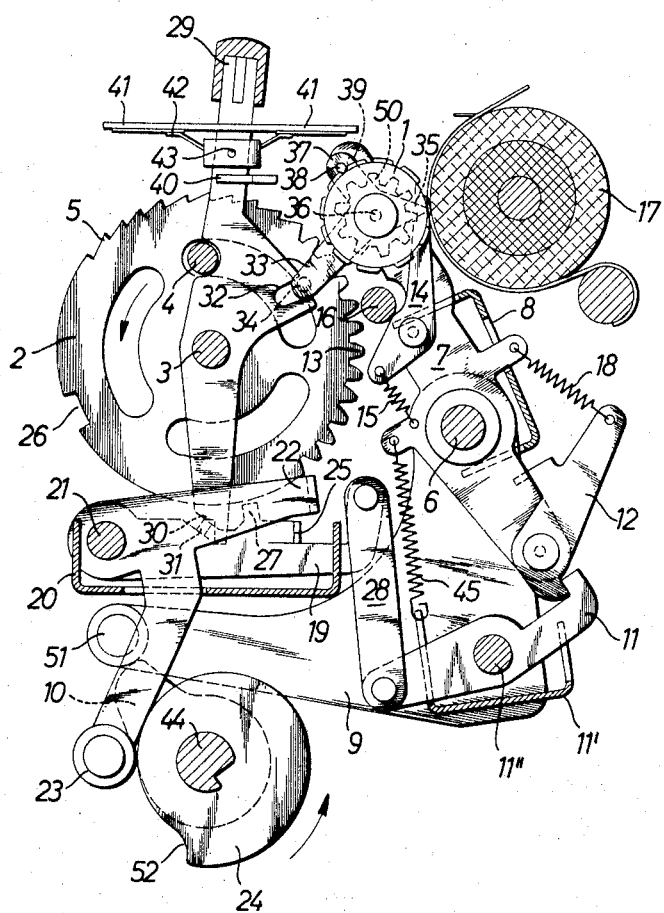
FIGURE 5 shows a similar view of the printer in the position in which the control wheel has been turned so that the recess in its peripheral surface is moved out of the range of the engagement of the nose of the feeler lever, and in which a numeral other than a zero may be printed in front of the decimal point or comma.
Figure 9:
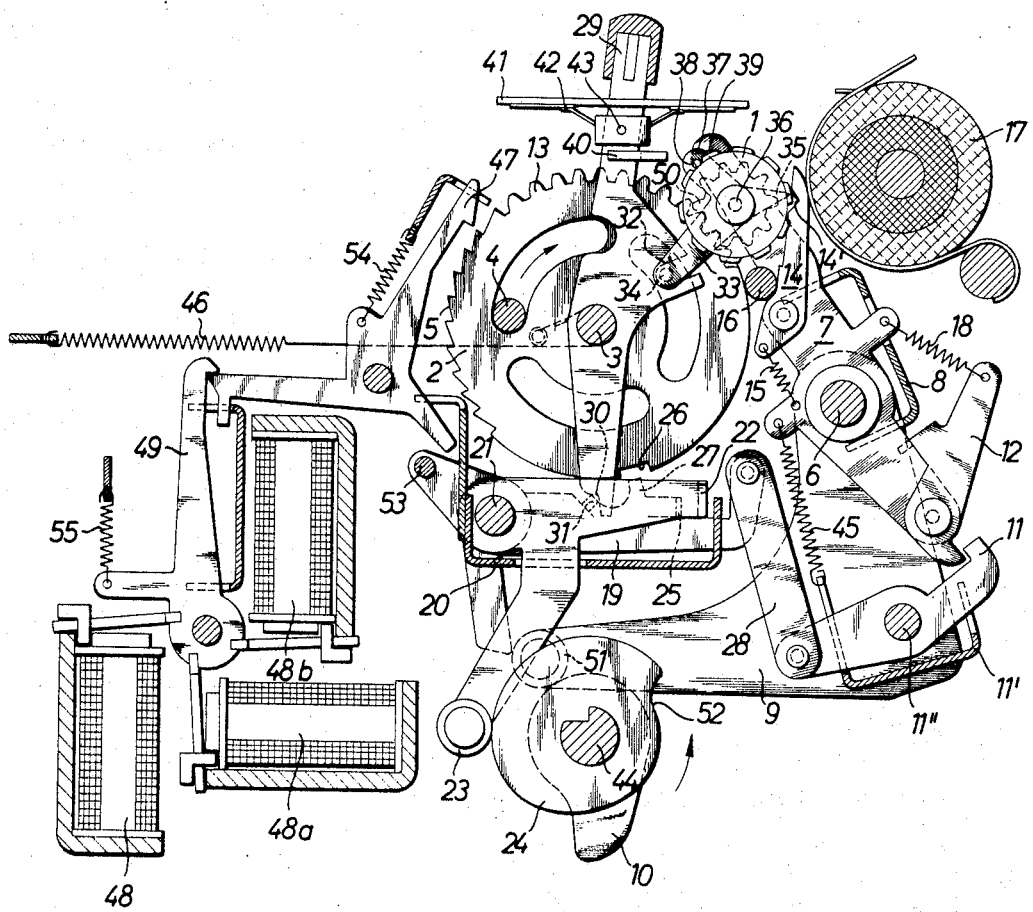
FIGURE 9 shows, partly in section, a diagrammatic side view of the parts of the printer which are required for stopping and releasing the control wheel.

Referring first particularly to FIGURES 1 to 5 of the drawings which diagrammatically illustrate the construction and cooperation of the elements of a digital printer according to the invention which are required for printing the numerals of one decade, these elements comprise a control wheel 2 which is rotatable for a limited distance about an axle 3 and is provided with teeth 13 which mesh with the teeth 50 of an associated type roller 1. When the control wheel 2 is turned for the appropriate distance, it will adjust the type roller 1 to the particular position in which the desired type thereon may be printed upon a strip of paper on a printing roller 17. The control wheel 2 for each decade is for this purpose provided with three arcuate slots which are disposed within a circle which is concentric to the axle 3. Through one of these slots a drive rod 4 extends which for each printing operation will once be moved to and fro along an arc by a central gear mechanism, not shown, and will thereby transmit a certain rotary motion to the control wheel 2. The distance which the drive rod 4 travels during this movement is determined by the distance between its starting or neutral position, as shown in FIGURE 1 to 3, and its end position, as shown in FIGURES 4 and 5. As shown particularly in FIGURE 9, a tension spring 46 is connected to the control wheel 2 and tends to turn it in a clock wise direction so as to maintain it in engagement with the drive rod 4. Thus when drive rod 4 is moved to its end position as shown in FIGURE 5, it engages upon the left end of the arcuate slot in wheel 2 and thereafter returns wheel 2 to its original position when it is turned in the counterclockwise direction to its starting position. The movement of drive rod 4 from its starting position to its end position is therefore transmitted to the control wheel 2 by the action of spring 46 and from the end position to the starting position by the positive engagement of drive rod 4 with the control wheel 2.

The adjustment of each type roller 1 to a value in accordance with a value as set up in an accumulator of the electronic computer occurs through suitable switch means, not shown, during the forward movement of the respective control wheel 2 when a current impulse is sent from the computer to the electromagnet 48, 48a, or 48b which is associated with this control wheel 2 and which, when thus energized will pivot a releasing pawl 49 so as to disengage it from one arm of a stopping pawl 47 so that a tooth on another arm of the latter will then under the action of a spring 54 engage at the required point between the saw teeth 5 of the control wheel 2, while the other teeth 13 of whele 2 will thereby arrest the associated type roller 1 in its properly set position for printing the same value as appears in the accumulator of the computer.

Since the distance between the ends of the entire set of type rollers 1 is so small that it would be impossible to provide within this distance all of the necessary electromagnets within one row in parallel alignment with each other, especially if they are to have a sufficient size and strength, it is necessary to divide these electromagnets into three rows or groups 48, 48a, and 48b each of which is disposed at a right angle to the adjacent group about the common pivot axis of all releasing pawls 49.

Each control wheel 2 is therefore associated with a separate stopping pawl 47 and a separate releasing pawl 49, as well as with a separate electromagnet of one of the three groups of magnets 48, 48a and 48b which are disposed at an angle of 90° to each other around the pivot axis of all releasing pawls. Each of these groups may consist, for example, of six electromagnets the coils of which may be mounted on a common yoke. In order to facilitate the manufacture of the releasing pawls 49 of the printer, they are all made of the same size and shape and each of them is provided with three notches so as to permit one of the armatures of either group of electromagnets 48, 48a, or 48b to engage into one or the other of these notches.

After all type rollers 1 have been adjusted so that their types to be printed correspond to the numerical value in the accumulator of the computer, they are pivoted toward the printing roller 17 in the manner as subsequently described so as to print their respective values on the strip of paper on the roller 17. After each printing operation of all type rollers has been completed, all stopping pawls 47 will be given an initial tension by the engagement of a rod 53 when this rod is pivoted about the axis of a rod 21 by being driven by two identical cam disks which are mounted on the main drive shaft 44 outside of the side plates of the frame of the apparatus. The stopping pawls 47 are then held in this tensioned position by the releasing pawls 49 until the next actuation of the latter is effected by the associated electromagnets 48, 48a, or 48b. Since each stopping pawl 47 is held under tension in its retracted position by its tension spring 54, the electromagnets only have to carry out a releasing function. The tension spring 55 which acts upon the releasing pawl 49 may be very weak since there is always sufficient time available for the return movement of this pawl to its original position. The other tension spring 54 on the stopping pawl 47 must, however, be quite strong so as to insure that at each release of this pawl it will immediately engage between the teeth 5 and stop the respective control wheel abruptly. This quick stopping action is therefore due to the fact that the stopping action is therefore due to the fact that the stopping movement of pawl 47 is effected by the small releasing movement of pawl 49 which is immediately followed by the sudden release of the tension of spring 54. Since the detent on the end of the long arm of pawl 49 has to carry out only a very short sliding movement to disengage from and release the stopping pawl 47, and since the armature of the electromagnet 48, 48a or 48b acts upon the pawl 49 near its pivot axis, each releasing movement of this pawl requires only a very small pivoting movement of the armature. This, in turn, means that only a small air gap is required between the core and armature of each magnet and that therefore a very small amount of energy is required for the actuation of each magnet.

In addition it may be mentioned already at this point that by providing a recess 26 in a suitable position in the peripheral surface of each control wheel 2, the first tooth 5 adjacent to the row of teeth 13 may be the ninth tooth and the following teeth 5 may be those for the numerals 8, 7, 6, etc. In this case, when a zero is to be set up, the control wheel 2 may be turned to its end position in which it will then be held by the drive rod 4 so that there will be no need to energize the associated electromagnet for setting up a zero.

The most important features of the invention insofar as it has been previously described are therefore as follows:

(1) Around the common pivot axis of all releasing pawls 49 three magnet yokes, each carrying, for example, six magnet coils, are mounted at an angle of 90° to each other; all of these electromagnets are of equal dimensions and have a small maximum air gap, and all of the stopping pawls 47 and releasing pawls 49 are likewise of equal dimensions and shapes;

(2) Each stopping pawl 47 is provided with a strong release spring 54 which insures a rapid engagement of this pawl between the teeth 5 of the control wheel 2; and (3) This spring 54 is tightened by a cam disk on the motor-driven main drive shaft of the printer by the pivoting movement of a tightening rod 53.

Figure 8:
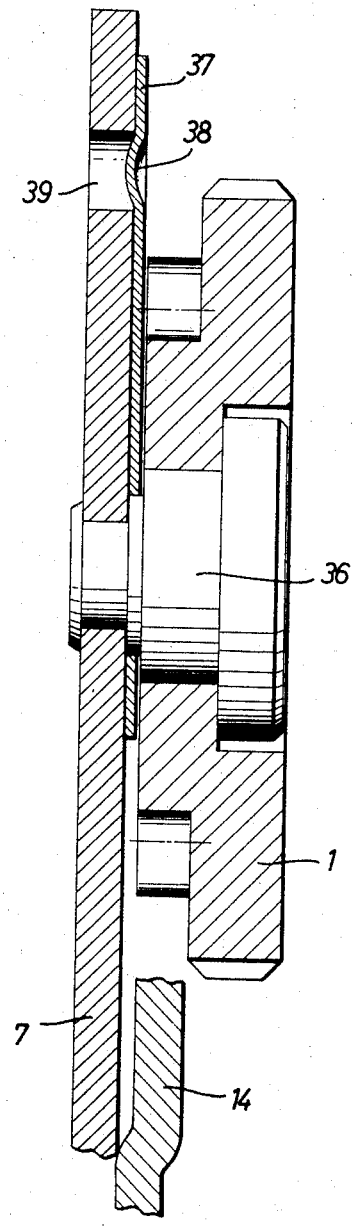
FIGURE 8 shows a vertical section of the type carrier and the type lever carrying the same, wherein the comma or point-carrying spring arm of the three-armed lever is in one of its engaged positions.

When drive rod 4 has reached its end position as shown in FIGURE 5, each electromagnet 48, 48a, and 48b has once been actuated at the particular moment when the release of the associated stopping pawl 47 should occur and when the type roller 1 has been set so that the desired type on this roller is ready to be printed. Each type roller 1 is rotatable about an axle 36 which is located on the upper arm of a two-armed type lever 7 which is pivotably mounted on a rod 6. Each type roller 1 will therefore be pivoted by a type lever 7 so that its teeth 50 will engage with or disengage from the teeth 13 of the associated control wheel 2. The axle 36 of each type roller 1 also pivotably supports a three-armed lever 33, 35, 37 which carries a point or comma symbol. One arm 33 of this lever carries on its free end a pin 34 which is slidably guided in a slot 32 which extends in a radial direction in the upper sector-shaped arm of a two-armed lever forming a control or setting member 29 which is likewise pivotably mounted on the axle 3 of control wheel 2. The second arm 35 of the three-armed lever carries the point or comma symbol on its free pointed end and is pivotable toward the printing roller 17, while the third arm 37 forms a spring in one side of which, as shown particularly in FIGURE 8, a spherical depression is provided resulting in a projection 38 on its outer side which is adapted to engage into one or the other of two bores 39 which are provided in type lever 7 near the free end thereof. When the projection 38 engages into one of these bores 39, the spring arm 37 will be held in the printing position for the following printing operation, while when it engages into the other bore 39, the spring arm 37 will be held in a fixed position when no printing of the point or comma symbol should take place. One end of a pawl 14 which is pivotably mounted on the type lever 7 is connected to this lever by a tension spring 15 which presses the pawl 14 against a rod 16 when the type roller 1 is in engagement with the control wheel 2. When the type roller 1 is disengaged from the teeth 13 of control wheel 2, a cam surface on pawl 14 will slide under the action of tension spring 15 over the rod 16, and a recess 14' in the free end of pawl 14 will engage over one of the teeth 50 of type roller 1 and thus arrest the latter until the particular type thereon to which it is adjusted has been printed on the paper strip on printing roller 17 and the type roller 1 has been moved back into engagement with the control wheel 2.

Underneath the control wheels 2 are feeler levers 19 which are pivotably mounted at one end on a rod 21 within a comblike guide member 20 and are pressed by springs, not shown, against the peripheral surface of the control wheels 2. Each of these feeler levers 19 is provided with a projecting nose 27 which is adapted to engage into a recess 26 as previously mentioned which is provided in the peripheral surface of each control wheel 2. Each feeler lever 19 is further provided with a laterally projecting tab 31 against which a stop surface 30 on the lower arm of the setting lever 29 will engage when the latter is pivoted by hand to the position in which it will move the lever 33, 35, 37 so that its point or comma-carrying part 33 will be in its printing position. The feeler lever 19 may in this manner be prevented from engaging into the recess 26 of control wheel 2. As illustrated particularly in FIGURE 7, each feeler lever 19 is further provided with a laterally projecting tab 25 which extends over the feeler lever 19 of the next lower decade so as to prevent this feeler lever 19 also from engaging into the recess 26 of its associated control wheel 2.

Figure 6:
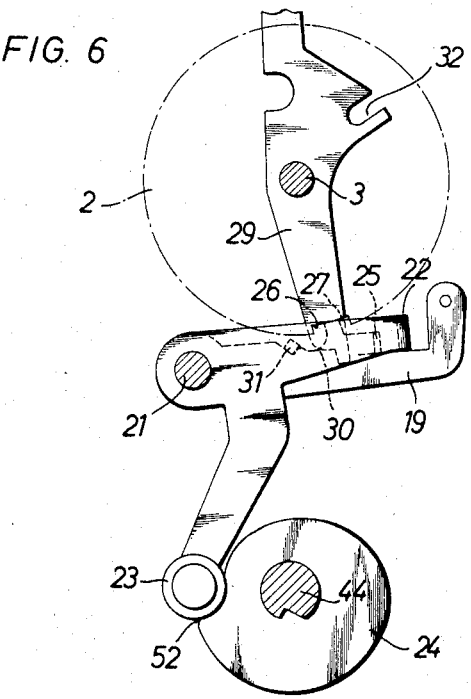
FIGURE 6 shows diagrammatically a side view of cooperating parts of the printer when zeros are being suppressed.
Figure 7:
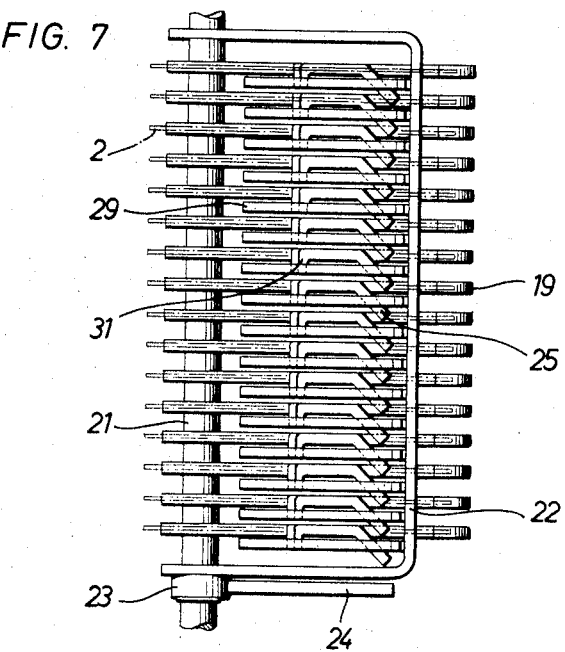
FIGURE 7 shows a top view of the parts according to FIGURE 6.

As shown especially in FIGURE 7, rod 21 further carries a U-shaped bridge 22 which is pivotable thereon and the transverse part of which extends across all of the feeler levers 19, while one of its side arms has integrally thereon another arm which, as shown particularly in FIGURE 6, carries on its free end a roller 23 which under the action of a spring, not shown, engages with and is adapted to roll along a cam disk 24 which is secured to the main drive shaft 44.

The free end of each feeler lever 19 is pivotably connected by a link 28 to a pawl 11 which in the normal position of lever 19 engages with a tooth on another pawl 12 which is pivotably mounted on the associated type lever 7. In this manner, type lever 7 is likewise pivotable together with its type roller 1 so as to move the latter toward the printing roller 17 and to print the particular type to which the type roller has been adjusted.

Rod 6 on which the type levers 7 are pivotable also pivotably supports on each end thereof a lever 9 which guides the type levers and carries on the end of its free arm a roller 51. Each of these rollers is movable under the action of a spring, not shown, along a cam disk 10 which is secured to the main drive shaft 44. Thus, each lever 9 is operatively associated with one of two equal cam disks 10 on drive shaft 44. Between these two levers 9 and secured thereto is a comblike guide member 11' in which all pawls 11 are pivotably mounted on a rod 11''. Above and below the rod 6, the type levers 7 are guided between the arms of another comblike member 8 which is secured to the housing and prevents the pawls 11 and 12 from unintentionally sliding past each other.

Each control lever 29 is adapted to actuate a mechanical locking device 40 which only permits one control member 29 to be shifted to a position as shown in FIGURE 4 in which only the symbol on the point or comma-carrying part 35 but none of the others can be printed. Each control lever 29 when shifted will also actuate a switch 41 which has a resilient sliding contact 42 mounted in a bearing 43 which is pivotable on the control lever 29. When actuated and in the position as shown in FIGURE 3, this switch 41 will close a circuit through which the particular comma position as set will be indicated in the computer. It is thus ensured that the values of the computer will always be transmitted to the printer and be printed with the comma inserted in the correct position.

The mode of operation of the digital printer according to the invention may be further described as follows:

For each printing operation, the main drive shaft 44 is driven by means of a one-revolution clutch, not shown, so as to carry out exactly one revolution. When the rollers 51 on the two levers 9 then start to roll up along the two cams of cam disks 10, pawls 11 and 12 which are in engagement with each other will pivot the type levers 7 to such an extent that the particular types on type rollers 1 which have been adjusted for printing, will engage with the paper strip on the printing roller 17. Cam disks 10 will then pivot the lever 9 slightly further in the clockwise direction and thereby move the pawls 11 and 12 for a certain distance further toward the left. The actual printing pressure of each type roller 1 is determined by the tension of spring 18 which is connected to levers 12 and 7 and also serves to compensate for any inaccuracies of manufacture and bearing play of the parts 9, 11, 12, 7, and 1 so that the types on all printing rollers 1 will be printed with an equal pressure. After the printing operation, each type lever 7 will be pivoted by a tension spring 45 from its position as shown in FIGURE 5 back to its original position as shown in FIGURE 1 so that the printing mechanism will then be ready for the next printing operation.

Since the digital printer according to the invention is designed so that the printing pressure of each individual type roller 1 against the printing roller 17 is determined by a separate spring 18, all types will be printed uniformly which constitutes a considerable advantage over other printers of known constructions in which the printing rollers are pressed against the type rollers so that the printing pressure depends upon the number of types to be printed and upon their accurate alignment with each other so that all of them will be located within a plane which is exactly parallel to the surface of the printing roller.

Due to the springs 18 and 45 and the particular shape of the cams 10, the digital printer according to the present invention also has the great advantage that it carries out a gradual "non-firing" printing operation and therefore operates with very little noise.

When the main drive shaft 44 has been turned for such a distance that the cam disk 24 is located in the position as shown in FIGURE 2, the roller 23 on bridge 22 will engage into a recess 52 in the peripheral surface of cam disk 24 under the action of the feeler lever 19 which is pressed against bridge 22 by a spring, not shown. Before the actual printing operation is effected by the cam disk 10, the feeler lever 19 will scan the control wheel 2 which has already been adjusted and, when the recess 26 in the peripheral surface of control wheel 2 is located above the nose 27 on feeler lever 19, the latter will engage into the recess 26. The pivoting movement of feeler lever 19 which is caused by its engagement into the recess 26 is transmitted by the link 28 to the pawl 11 which is thereby disengaged from pawl 12 and pivoted to the position as shown in FIGURE 2. From the above description it is evident that no printing can be carried out by the type rollers 1 on all type levers 7 on which the associated pawls 11 and 12 are not in engagement with each other.

It is further evident from the previous description that, when any control wheel 2 has been moved out of its zero position in which its recess 26 coincides with the position of the nose 27 on the feeler lever 19, the latter can no longer engage into this recess 26. By means of its lateral projection 25, as shown particularly in FIGURE 7, this feeler lever 19 will then prevent the feeler lever 19 of the next lower decade from engaging into the recess 26 of the associated control wheel 2, and the lateral projection 25 on that feeler lever 19 will, in turn, prevent the feeler lever 19 of the next lower decade from engaging into the recess 26 of its control wheel 2, and so forth. Consequently, the zero suppressing means 19, 26, 28, and 11 of all subsequent lower decades will be locked so that the zeros which are set up in these lower decade positions will be printed. The recess 26 of each control wheel 2 is provided in a position of its peripheral surface which corresponds to the position of adjustment of the associated type roller 1 on which the numeral 0 is turned to its printing position, as shown in FIGURE 2.

When a decimal point or comma is set by the actuation of the control member 29 in the manner as previously described, only those zeros will not be printed which would otherwise appear in front of a first numeral other than a zero at the left of the point or comma or in front of a zero in the first position at the left of the decimal point or comma. This is effected by the cooperation of the manually adjustable setting member 29 with the associated feeler lever 19.

Figure 10:
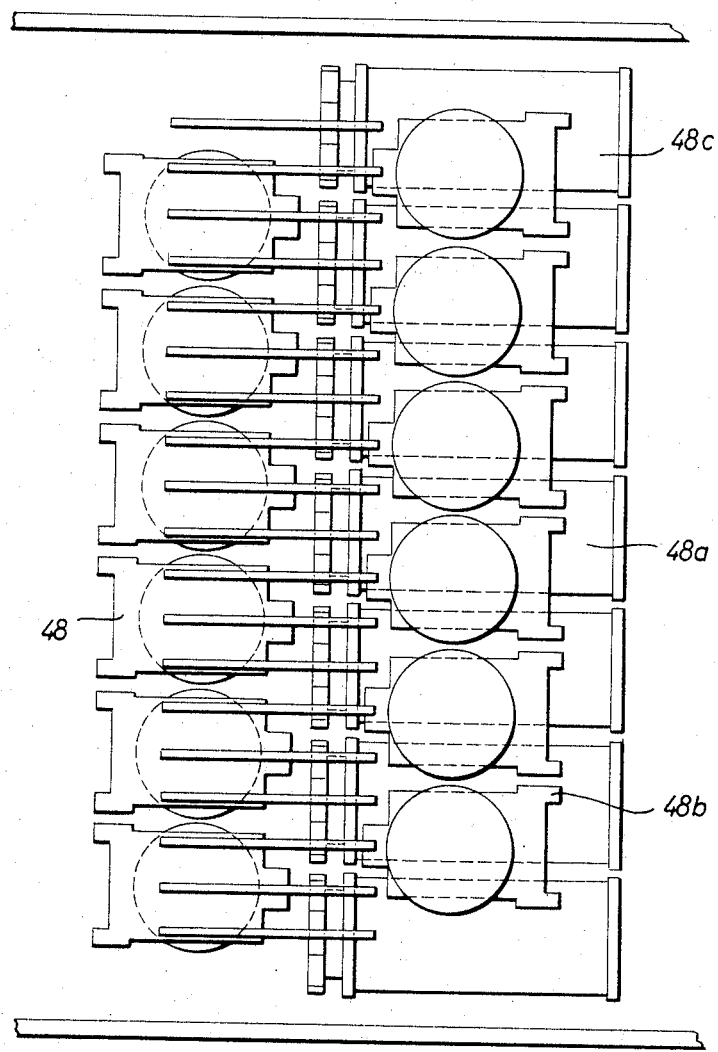
FIGURE 10 shows a top view of the arrangement of the electromagnets in three groups or rows as shown in FIGURE 9.
Figure 11:
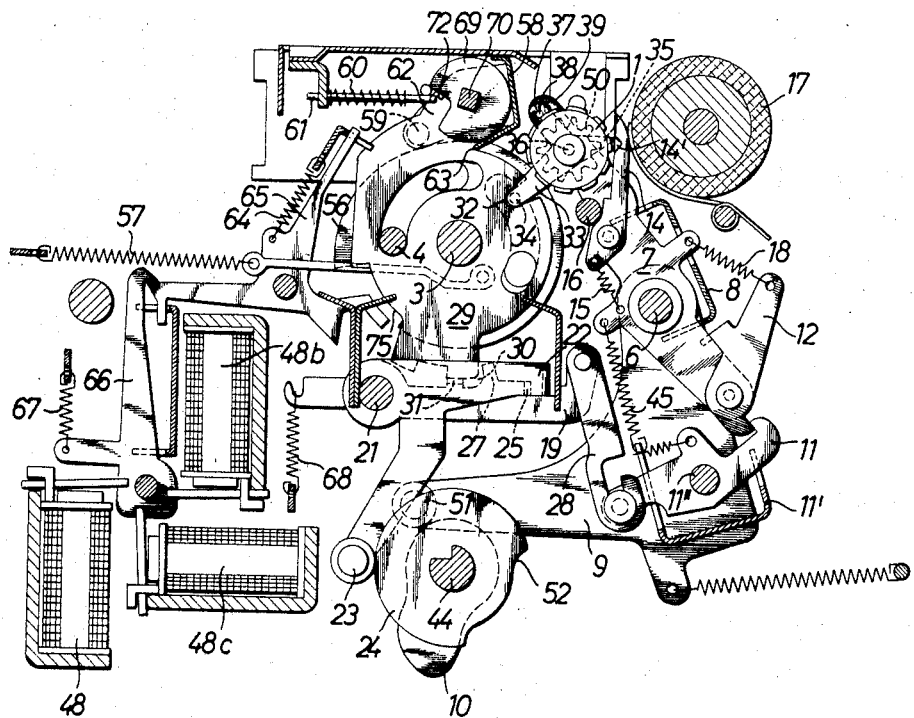
FIGURE 11 shows a diagrammatic side view of a digital printer according to a modification of the invention in the position in which a decimal point or comma may be printed.
Figure 12:
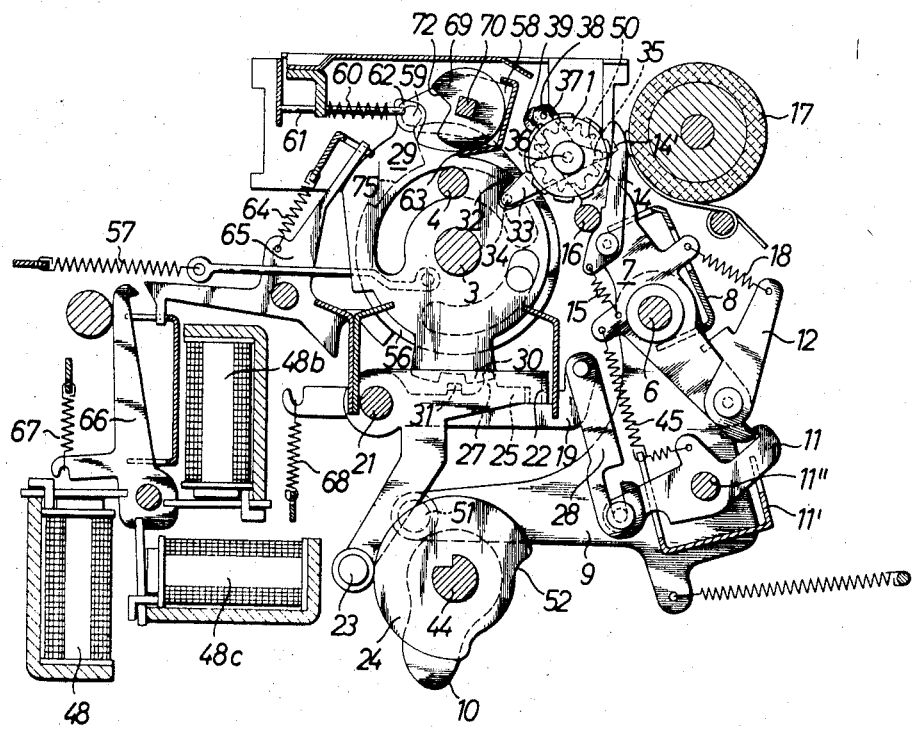
Figure 13:
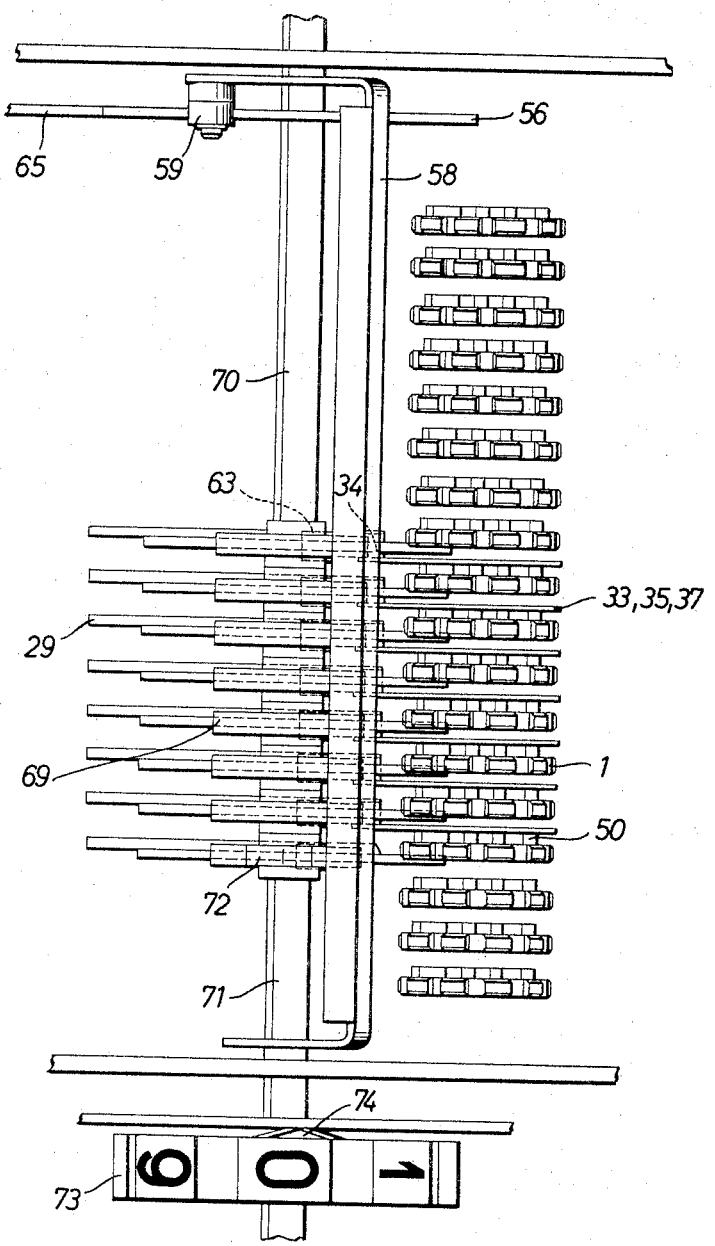
FIGURE 13 shows a diagrammatic top view of a part of the digital printer according to FIGURES 11 and 12.

FIGURES 11 to 13 illustrate a modification of the digital printer according to the invention, in which all those elements which are equal in structure and function to those as shown in FIGURES 1 to 10 are also designated by the same reference numerals, while the new reference numerals 56 to 75 designate the newly added elements as will be hereafter described. In order to simplify these drawings, some of the essential elements have been omitted, for example, the control wheels 2.

As shown particularly in FIGURES 11 and 12, the upper part of each setting member 29 is provided in place of the setting handle with a nose 62 which is pressed against a stepped drum 71 by a rod 61 which is acted upon by a spring 60.

As also shown in FIGURE 13, this stepped drum 71 consists of a square shaft 70 on which cam disks 69 are mounted each of which is provided with a recess 72 and which are peripherally offset relative to each other so that only the nose 62 on one control member 29 can engage into a recess 72. The cam disks may be produced at a very low cost if eight exactly equal disks are employed wherein one side of the square hole of each disk extends at an angle of 22.5° to one flat side of its angular recess 72. By turning the cam disks to four different positions relative to the square shaft 70 when slipping them from one side over the latter and by then reversing the position of the entire disk and then likewise turning it to four different positions relative to shaft 70 when slipping it thereon, it is possible to mount each cam disk on shaft 70 so that its recess 72 will face in either of eight different radial directions.

One end of shaft 70 of the stepped drum 71 carries a handwheel 73 on which numerals are marked which indicate the different positions in which the decimal point or comma when set up may be placed in the desired position by turning the handwheel 73 accordingly. Handwheel 73 further carries a contact spring 74 which is adapted to close the contacts of a switch corresponding to the switch 41, and 42 as shown in FIGURES 1 to 5, which permits the position to which the point or comma is adjusted to be reported to the computer and to be indicated therein.

If an indicating number without a point or comma, for example, an account number, is to be printed which is not intended for the calculating process itself, the printing of the point or comma may be prevented by providing a cam disk 56 which is rotatably mounted on the axle 3 which also carries the control wheels 2 (not shown in FIGURES 11 and 12). This cam disk 56 is acted upon by a tension spring 57 which tends to turn it in the clockwise direction. When cam disk 56 is turning, a roller 59 on one arm of a comb-shaped bridge 58 will roll along this cam disk. Each tooth or prong 63 of this bridge engages with a projection on a control member 29 or into a recess therein. When cam disk 56 is in its neutral position, its rotary movement will be prevented by a locking pawl 65 which engages into a recess 75 in cam disk 56. This locking pawl 65 is held in engagement with cam disc 56 by a releasing pawl 66 which is pressed by a spring 67 against the locking pawl 65. By the provision of an additional electromagnet 48c (as also shown in FIGURE 10) which is mounted in the same row containing the magnets 48a and is energized by a special impulse sent from the computer, it is possible to actuate the releasing pawl 66 so as to release the locking pawl 65 which is thereupon moved by a spring 64 out of the recess 75 in cam disk 56.

If an indicating number as described above is to be printed, a signal is transmitted from the computer which energizes the magnet coil 48c so that the releasing pawl 66 will be actuated which, in turn, then releases the locking pawl 65. Spring 64 then moves this locking pawl 65 out of the recess 75 in cam disk 56 so that, during the arcuate reciprocating movement of drive rod 4 which occurs once during each printing operation, the cam disk 56 will turn in the clockwise direction and thereby move the bridge 58 to the position as shown in FIGURE 12. The prongs 63 of bridge 58 then push the control member 29 from its position in which a point or comma may be printed back in the counterclockwise direction so that the point or comma-carrying member will be shifted from the position in which a point or comma may be printed to the non-printing position. At the same time, the stop surface 30 on the control member 29 is moved past the tab 31 on feeler lever 19 so that the latter can move upwardly and its nose 27 can scan the control wheel 2 (not shown in FIGURES 11 and 12). The means 30 and 31 for locking the zero-suppressing device according to FIGURES 1 to 10 (i.e., the elements 11, 12, 19, 26, 27, and 28) in a position in which all zeros in front of a first numeral or a first zero at the left of the decimal point or comma are suppressed will thereby be released so that all zeros which might otherwise appear in front of a first numeral will be suppressed and no point or comma will be printed.

When the printing operation of the indicating number is completed, the cam disk 56 will again be moved back by drive rod 4 to the position as shown in FIGURE 11. At the same time, a cam, not shown, which may be provided, for example, on bridge 22 and is movable together with this bridge about the rod 21 moves the locking pawl 65 back to its original position as shown in FIGURE 11, in which it will be held by the releasing pawl 66. Therefore, after the indicating number has been printed, the point or comma setting which was previously selected will be automatically reestablished.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A high-speed multi-cipher digital printer associated with and electrically controlled by an electronic computer or the like and comprising, in combination, a printing base, a plurality of control wheels rotatable about a common axis and having teeth, a plurality of type levers, a type roller having teeth rotatably mounted on each type lever, a main motor-driven shaft adapted to carry out one revolution at each actuation of said printer by said computer, cam means on said shaft indirectly connected to all of said type levers for pivoting the same from a setting position in which said type rollers are in mesh with said control wheels to a printing position in which said type rollers are disengaged from said control wheels and are pressed independently of each other but simultaneously with an equal pressure against said printing base, drive means controlled by said shaft for turning said control wheels and said type rollers in said setting position during said revolution of said shaft in one direction from a neutral position for setting said type rollers and for returning all control wheels and type rollers to said neutral position after each printing operation of said type rollers, a plurality of stopping pawls pivotable about a common axis and each associated with one of said control wheels and pivotable from a retracted position spaced from said control wheel to a stopping position in locking engagement with one of the teeth of said control wheel so as to stop said wheel and said type roller, a stopping spring acting upon each stopping pawl and, when tightened, tending to pivot the same rapidly toward said control wheel, releasing means comprising a plurality of electromagnets having armatures and each adapted to be energized by a current impulse sent from said computer in accordance with a numerical value set up in said computer, each of said armatures normally holding one of said stopping pawls in said retracted position and, when said magnet is energized, disengaging from and releasing said stopping pawl so that said stopping spring will then pivot said pawl rapidly to said stopping position and thereby lock said type roller in said setting position with the type to be printed facing said printing base, means operatively connected to said shaft for pivoting all of said stopping pawls after each printing operation of said type rollers to said retracted position and into engagement with said armatures and for thereby also tightening said stopping springs, a plurality of symbol carriers each having a decimal point of comma symbol thereon and each associated with and pivotable about the axis of one of said type rollers from a neutral position to an active position in which said symbol is in accurate alignment with the set types of said type rollers, a plurality of manually actuated one-piece setting elements each adapted positively to pivot one of said symbol carriers from its neutral position to its active position, locking means for preventing the actuation of more than one setting element, zero suppressing means for preventing the printing of zeros in front of a first numeral other than a zero, said actuated setting element being associated directly with said zero suppressing means for locking the same in a position in which all set zeros on the type rollers at the right of the actuated symbol carrier will be printed and also, if desired, a lone zero on the first type roller at the left of the actuated symbol carrier will be printed, as well as all zeros at the left of and intermediate said actuated symbol carrier and the type roller of the highest decade on which a numeral other than a zero has been set, a common lever interposed between each type lever and said cam means, spring means connecting said common lever and each type lever to each other for determining the printing pressure of each type roller and said actuated symbol carrier against said printing base, and switch means for electrically indicating in said computer the position of the symbol of said actuated symbol carrier.

2. A digital printer as defined in claim 1, wherein each of said type levers has two bores therein, each of said setting elements consisting of a two-armed lever pivotable about the axis of said control wheels and having an elongated hole therein, each of said symbol carriers consisting of a three-armed lever having one arm slidably guided in said hole, a second arm having said decimal point or comma symbol on its free end facing said printing base when said symbol carrier is pivoted to its actuated position, and a third arm forming a leaf spring having a projection on one side near its free end engaging into one of said bores in said type lever so as to prevent its displacement when said type lever is in said setting position and engaging into the other bore when said type lever is pivoted from said setting position to said printing position.

3. A digital printer as defined in claim 1, wherein said zero suppressing means comprise a recess in the peripheral surface of each control wheel in a position corresponding to the relative position between said control wheel and its associated type roller in which position said type roller is set to print a zero, a plurality of feeler levers each associated with one of said control wheels and having one end pivotable about a common axis and a projecting nose near the free other end thereof, a spring pressing said other end of said feeler lever toward said peripheral surface of said control wheel so that said noise will engage into said recess when said nose and recess are in coinciding positions, a plurality of first pawls mounted on said common lever so as to be pivotable about a common axis, a second pawl pivotably mounted on each of said type levers and normally interengaging with one of said first pawls, and a link pivotably connecting said free end of said feeler lever to each of said first pawls so that, when said feeler lever is pivoted toward said control wheel by its nose engaging into said recess, said first pawl is pivoted to disengage from said second pawl so that said feeler lever can no longer be pivoted from said setting position to said printing position by said cam on said shaft.

4. A digital printer as defined in claim 3, wherein each of said feeler levers has a lateral projection, the end of the second arm of said two-armed lever forming each of said setting elements having a locking surface which, when one of said setting elements is pivoted to said actuated position, may be moved into engagement with said projection on said feeler lever so as to prevent said nose on said feeler lever from engaging into said recess in said control wheel for thereby locking said zero suppressing means.

5. A digital printer as defined in claim 4, wherein each of said feeler levers has a lateral projection which, when said nose of a first feeler lever cannot engage into said recess in its associated control wheel for one decade because said wheel has been turned so that its recess has passed beyond said nose, overlaps the adjacent second feeler lever which is associated with the control wheel for the next lower decade, and said projection on said second feeler lever and on each following feeler lever also overlaps the next following feeler lever so that said first feeler lever then prevents the noses of all following feelers for the lower decade wheels from engaging into the recesses in their associated control wheels.

6. A digital printer as defined in claim 1, further comprising a pawl pivotably mounted on each type lever, a tension spring connecting said further pawl to said type lever and tending to press one end of said pawl against the gear teeth on the associated type roller so as to prevent any rotary movement of said type roller during its movement to and from said printing base, and a stop member for preventing said further pawl from engaging with said gear teeth while said type roller is in said setting position in geared engagement with said control wheel.

7. A digital printer as defined in claim 1, wherein said releasing means further comprise a plurality of releasing pawls pivotable about a common axis and each adapted to engage with and disengage from one of said stopping pawls and each having at least one recess near said axis, a tension spring connected to each releasing pawl and tending to pivot the same toward said stopping pawl, said electromagnets being mounted in several rows with the magnets in each row extending parallel to each other so as to reduce the width required by the elements of said printer, each of said rows being disposed at an angle to the adjacent row, the coils of the magnets of each row having a common yoke, said armature of each magnet having a free end projecting into said recess of one of said releasing pawls for pivoting the same about said axis against the action of said tension spring so that a tooth on the end of the relatively long arm of said pawl will be withdrawn from the end of one arm of the associated stopping pawl permitting the latter to pivot under the action of said stopping spring to engage rapidly with a tooth of said control wheel, said means for pivoting all of said stopping pawls to their retracted position and for tightening said stopping springs comprising at least one cam disk on said shaft, a two-armed lever pivotable about a fixed axis by said cam disk after each printing operation of said type rollers and when said type rollers have been pivoted back to their setting position, said lever having one arm with a roller thereon engaging with said cam disk, and a rod on the end of its other arm and extending parallel to said fixed axis and adapted to engage simultaneously upon all of said stopping pawls.

8. A digital printer as defined in claim 1, wherein each of said control wheels has an equal arcuate slot of a certain length, said means for turning said control wheels comprising a drive rod extending through all of said arcuate slots and operatively connected to said shaft so as to move from a first end of said slots toward the other end, and a plurality of tension springs each connected to one of said wheels and tending to turn said wheel in one direction and thereby tending to hold the first end of said slot in said wheel in engagement with said drive rod so that, when said rod moves in one direction, said wheel turns with said rod from its neutral position by the action of said tension spring at least until said stopping pawl engages with one of the teeth of said wheel and stops said wheel, while when said rod is moved in the other direction after each printing operation it positively acts upon said first end of said slots to return all of said wheels to their neutral position.

9. A digital printer as defined in claim 1, further comprising selecting means associated with all of said setting elements for selecting one of them and for moving it so as to pivot its associated symbol carrier from its neutral position to its active position, said selecting means comprising a hand-actuated dial member and numerals associated with said dial member denoting the positions in which a decimal point or comma is to be set in a multi-cipher numeral to be printed.

10. A digital printer as defined in claim 9, wherein each of said setting elements has a nose-like projection, said selecting means further comprising a square shaft rotatably mounted in a fixed position, and a plurality of equal cam disks each having a square central aperture through which said square shaft extends and each having a recess in its peripheral surface peripherally offset relative to the recesses in the other cam disks so that each recess faces in a different radial direction, separate spring means associated with said noselike projection on each setting element tending to press said projection on one setting element into the recess of the associated cam disk facing said projection, said dial member comprising a handwheel secured to one end on said square shaft for manually turning the same and having said numerals thereon, said switch means comprising a contact associated with each setting element and electrically connected to said computer and a contact spring on said handwheel for indicating in said computer the position of the symbol of the actuated setting element, a further cam disk rotatable about the axis of said control wheels having a recess in its peripheral surface, a tension spring connected to said further cam disk tending to turn the same in the clockwise direction, each of said control wheels having an equal recess, a bridgelike element traversing said setting elements and having a roller engaging with and adapted to roll along said further cam disk so that said element will be pivoted thereby, said bridgelike element having a plurality of projections each being adapted to engage into said recess in the associated control wheel, a locking pawl adapted to engage into said recess in said further cam disk so as to prevent the rotation thereof, a releasing pawl, a tension spring connected to said releasing pawl and tending to hold the same in engagement with said locking pawl, a tension spring connected to said locking pawl and tending to retract the same from said recess in said further cam disk, and an additional electromagnet adapted to be energized by a special current impulse sent from said computer so as to disengage said releasing pawl from said locking pawl when a number without any decimal point or comma is to be printed.

11. A digital printer as defined in claim 10, wherein one corresponding side wall of said square aperture in each of said equal cam disks on said square shaft is disposed at an angle of 22.5° relative to one side wall of said recess in the peripheral surface of said cam disk so as to permit eight of said cam disks to be mounted on said shaft so that their recesses will be equally offset relative to each other and thus face in different radial directions from each other.

References Cited
UNITED STATES PATENTS

| | | | |
|---|---|---|---|
| 1,951,592 | 3/1934 | Barrett | 101—93 |
| 2,109,309 | 2/1938 | Brietling | 101—93 |
| 2,346,265 | 4/1944 | Mehan | 101—96 |
| 2,800,074 | 7/1957 | Busch et al. | 101—96 |
| 2,802,415 | 8/1957 | Heinze et al. | 101—93 |
| 2,819,672 | 1/1958 | Eckhard | 101—93 |
| 2,872,862 | 2/1959 | Lydfors | 101—93 |
| 2,986,993 | 6/1961 | Gang | 101—93 |
| 3,016,007 | 1/1962 | Gelling | 101—93 |
| 3,051,082 | 8/1962 | Wagemann | 235—60.28 X |
| 3,221,644 | 12/1965 | Gelling | 235—60.28 X |

WILLIAM B. PENN, *Primary Examiner.*

U.S. Cl. X.R.

235—60.28